United States Patent [19]

Finkbeiner

[11] Patent Number: 4,661,749

[45] Date of Patent: Apr. 28, 1987

[54] APPARATUS FOR ENSURING SYNCHRONISM IN LIFTING JACKS

[76] Inventor: Walter Finkbeiner, Kasernenstrasse 6, 7290 Freudenstadt, Fed. Rep. of Germany

[21] Appl. No.: 651,518

[22] Filed: Sep. 17, 1984

[30] Foreign Application Priority Data

Sep. 15, 1983 [DE] Fed. Rep. of Germany ....... 3333292

[51] Int. Cl.[4] ............................................ H02P 7/68

[52] U.S. Cl. .................................... 318/41; 318/648; 318/75; 254/89 H; 254/93 R

[58] Field of Search ..................... 318/41, 648, 74, 75; 254/89 H, 93 L, 93 H, 2 C, 2 B, 2 R, 10 C, 10 B; 361/166, 167

[56] References Cited

U.S. PATENT DOCUMENTS

| | | | |
|---|---|---|---|
| 3,036,816 | 5/1962 | Stubbs | 254/89 H |
| 3,265,357 | 8/1966 | Schilling | 254/89 H |
| 3,396,944 | 8/1968 | Jansz | 254/89 H |
| 3,858,688 | 1/1975 | Galloway | 254/89 H |
| 3,881,687 | 5/1975 | Johansson | 254/89 H |
| 4,050,673 | 9/1977 | Nishimura | 254/89 H |
| 4,328,951 | 5/1982 | Laupper | 254/89 H |
| 4,462,569 | 7/1984 | Arzouman | 254/8 B |

*Primary Examiner*—William M. Shoop, Jr.
*Assistant Examiner*—Patrick C. Keane

[57] ABSTRACT

The apparatus positively induces synchronism in at least two lifting jacks. It has an upwardly and downwardly movable carriage on the lifting jack, a column, a lifting device extending along the column, a first control device to control the lifting device in the "lift" direction, a second control device to control the lifting device in the "lower" direction, a "lift" switch on the main lifting jack, a "lower" switch on the main lifting jack. For each lifting jack, a motor device acts on the lifting device. Along each column there is an equally spaced marking unit, the spacing corresponding to the maximum admissible lift difference between the lifting jacks. Each marking unit has an 'ON' zone and an 'OFF' zone. Rigidly fixed to each carriage is a tracer for scanning the marker units. Each tracer, is in an electrical switching device, and inhibits the motor device when the tracer is in the 'OFF' zone, until such time as the tracer of the carriage which is lagging most behind is also in the 'OFF' zone. After that, the switching device switches all motor devices on again.

3 Claims, 5 Drawing Figures

APPARATUS FOR ENSURING SYNCHRONISM IN LIFTING JACKS

The invention relates to an apparatus for positively inducing synchronism in at least two lifting jacks. More particularly, such apparatus has an upwardly and downwardly movable carriage on the lifting jack, a column, a lifting device extending along the column, a first control device to control the lifting device in the "lift" direction, a second control device to control the lifting device in the "lower" direction, a "lift" switch on the main lifting jack, and a "lower" switch on the main lifting jack. For each lifting jack, a motor device acts on the lifting device.

There are lifting jacks which have a compressed air drive (referred to as climbing jacks). There are also lifting jacks with a spindle drive. There are also lifting jacks in which a hydraulic ram is used in the lifting device.

All these lifting jacks have an upwardly and downwardly movable carriage which supports the lifting tackle. The carriage runs up and down a column. There is an operating switch for "lift" and another switch for "lower".

Such lifting jacks are not used just singly but in pairs, in two pairs, in three pairs, etc.

An ideal situation would be for all the carriages always to be at the desired starting point. The simplest case is where all carriages are at the same absolute height. In such an instance, for example, an omnibus will be lifted vertically upwardly.

There is however also a case where, for example, one of the lifting jacks is on ground which is lower than the others.

This means that its carriage must be higher so that the carriages as a whole are once again at the same level.

In practice, however, there are always cases where, although all lifting jacks are standing on ground which is level, the carriage of one lifting jack (or the carriages of several lifting jacks) are at different heights from one another. This happens when an object is intentionally lifted at an angle or when an object has different projections which require the lifting tackle to apply the carriage at a different height.

However, it is necessary always to ensure that the desired height disposition of the carriages is retained.

Many systems work on the basis whereby all the carriages move to the lowest position at some time or another and then adopt this position as a reference position. However, with such a system, the carriages run away if there is frequent upwards and downwards movement and if the reference position is not achieved for any length of time. For various reasons, the carriages run at different speeds even with careful attunement, maybe because there are structural tolerances and maybe because the load on one carriage is greater than on the other, etc.

In the case of motor-driven spindle drives, one solution is for the electric motors to be so heavily over-dimensioned that friction is negligible and if it is then assumed that the spindle nut will after a specific period be dependably at a specific location. In this case, over-dimensioning is a disadvantage. Furthermore, these motors are mostly provided at the upper end of the column so that the lifting jacks become top heavy.

All systems which are driven without clutches also have the disadvantage that the motors and the gearboxes which are always on the downstream side constitute a considerable mass, so that they neither start up at the same time when switched on nor stop at the same time when switched off. This, too, is a reason for a lack of synchronism.

There are also highly electronic devices which operate digitally, count spindle revolutions, calculate paths, etc. For rough workshop operation of portable lifting jacks, it is true that very intelligent but not sufficiently rugged systems are inappropriate.

Where such lifting jacks are concerned, a certain lack of synchronism can be overcome because they move loads in the range from 3 to 15 tons. In bulk, such loads are so large that a lack of synchronism is hardly noticeable. In practice, it has been demonstrated that with the distances which arise between one lifting jack and the next, and with the loads which are involved, a 5 cm lack of synchronism over the group is, by and large, tolerable.

OBJECT AND STATEMENT OF THE INVENTION

The object of the invention is to indicate an apparatus which is simple in practice and which positively produces synchronous movement within an acceptable range of asynchronism. At the same time, there is no need for drive sources to be over-dimensioned. Nor should it be necessary for the carriages to run up to reference positions, and regardless of how frequently and in what direction the carriage travels, synchronism should be retained within the tolerance.

According to the invention, along each column there is an equally spaced marking unit, the spacing corresponding to the maximum admissible lift difference between the lifting jacks. Each marking unit has an 'ON' zone and an 'OFF' zone. Rigidly fixed to each carriage is a tracer for scanning the marker units. Each tracer is in an electrical switching device, and inhibits the motor device when the tracer is in the 'OFF' zone, until such time as the tracer of the carriage which is lagging most behind is also in the 'OFF' zone. After that, the switching device switches all motor devices on again.

The invention ensures that after a timed sequence the carriages are at the same location. If the carriages of slower lifting jacks reach this location later, then the fastest lifting jack will wait for the second fastest, the second fastest and the fastest will wait for the third fastest, this in turn will wait for the fourth fastest and so on and when all carriages have reached the same desired position, the carriages will move again from a starting line. If all the carriages are to run at one level, then this starting line is common to all carriages. Otherwise, the starting line of the individual carriage will be farther removed by the desired amount of offset.

DESCRIPTION OF THE DRAWINGS

The ensuing description describes a preferred embodiment of the invention which is shown in the accompanying drawings, in which.

DESCRIPTION OF THE DRAWINGS

Figure 1:
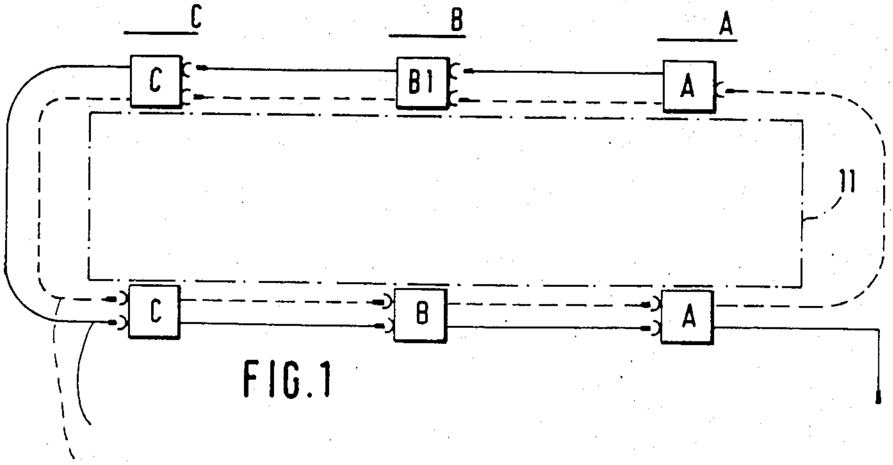
FIG. 1 is a plan view of three pairs of lifting jacks with one vehicle.

In FIG. 1, a vehicle 11 shown by dash-dotted lines is being lifted, in fact by three pairs of lifting jacks. On the main jack A there is a switch S1 for "lift" and a switch S2 for "lower". The power supply is looped through to all the lifting jacks. The power supply line is shown as a continuous line. Furthermore, emerging from main jack A there is a control line which is shown by broken lines and which is likewise looped through all lifting jacks. As FIG. 1 shows, the control line, in contrast to the power supply line, does not end at the subsidiary jack A but leads from subsidiary jack A onto the main jack A. Thus, there is a closed loop.

Figure 2:
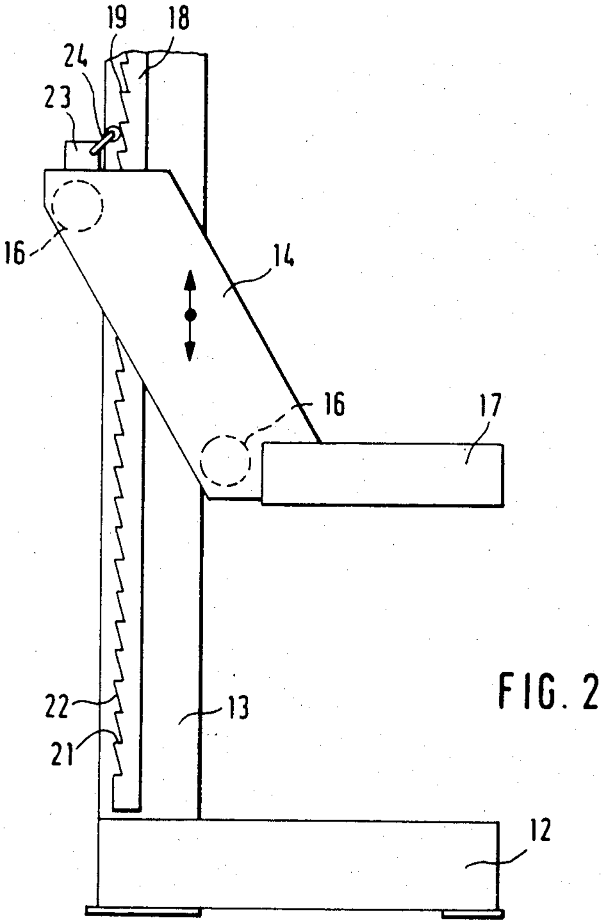
FIG. 2 is a simplified broken away side view of a lifting jack.
Figure 5:
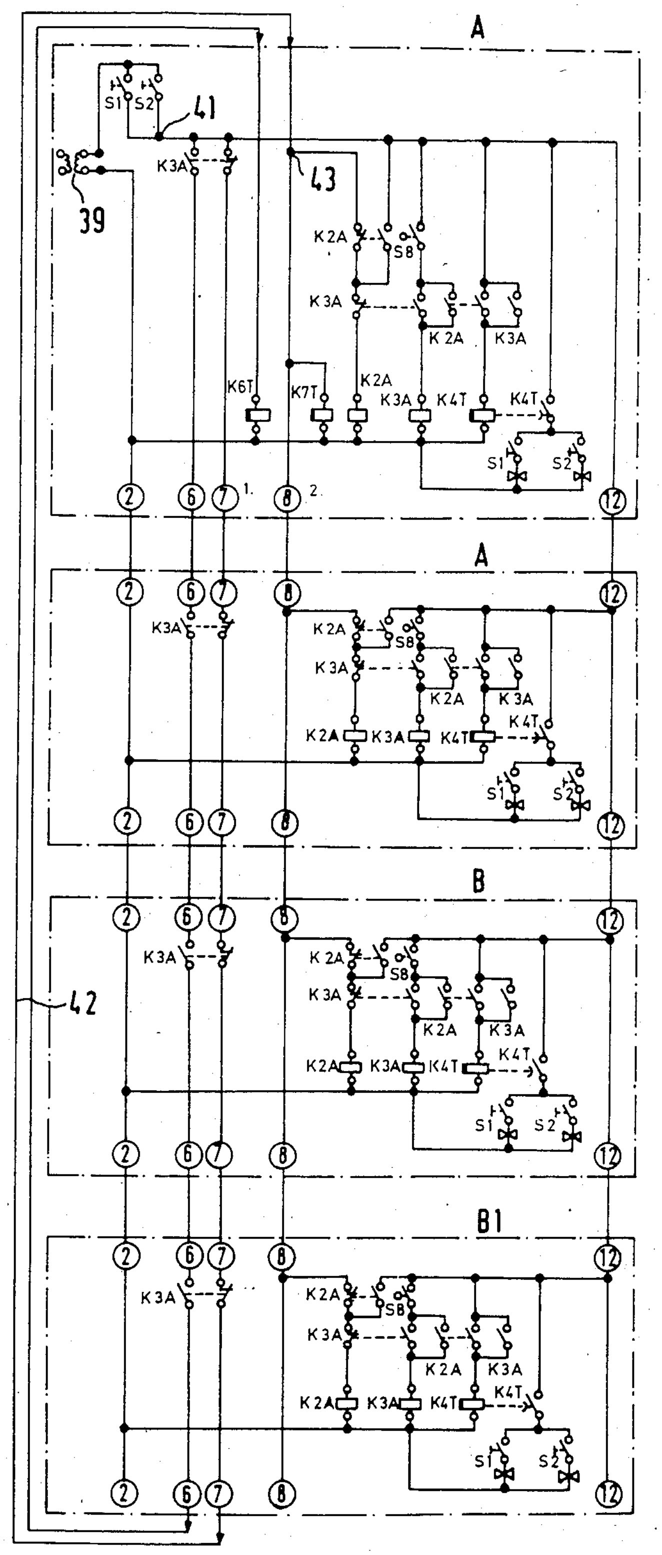
FIG. 5 shows an actually executed and satisfactorily operating circuit.

The lifting jack according to FIG. 2 is, for all lifting jacks, used in accordance with the disposition shown in FIG. 1. As FIG. 5 shows, each lifting jack has its own switch S1 for lift and S2 for lower. These are used when the lifting jacks are operated individually. However, if the lifting jacks are run jointly, then according to FIG. 5 the switches S1 Lift and S2 Lower shown top left are also provided and are located in the control line.

The lifting jack according to FIG. 2 has in the usual manner a foot 12 on which stands a column 13 which is vertically disposed. Running up and down on it is a carriage 14 which is mounted on the column 13 through rollers 16. Fixed to the carriage 14 is the supporting tackle 17. Parallel with and fixed on the column 13 is a rack 18 which has saw teeth 19 pointing leftwards in FIG. 2. The saw teeth are 5 cm long and have a horizontal step 21 and a linearly leftwardly and upwardly rising flank 22. The rack 18 in itself serves as a mating piece for a security ratchet mechanism in which detents engage the saw teeth 19 so that the carriage 14 cannot unintentionally fall downwards.

According to FIG. 2, there is at the top and on the left and on the carriage 14 a switch S8 which has a switch housing 23, a pivot lever 24 and a roller 26. The pivot lever 24 is spring loaded and biased in a clockwise direction according to FIG. 2.

Instead of such electromechanical switches S8, other switches may be used, such as for example contactless proximity switches, light-actuated switches or the like.

Figure 3:
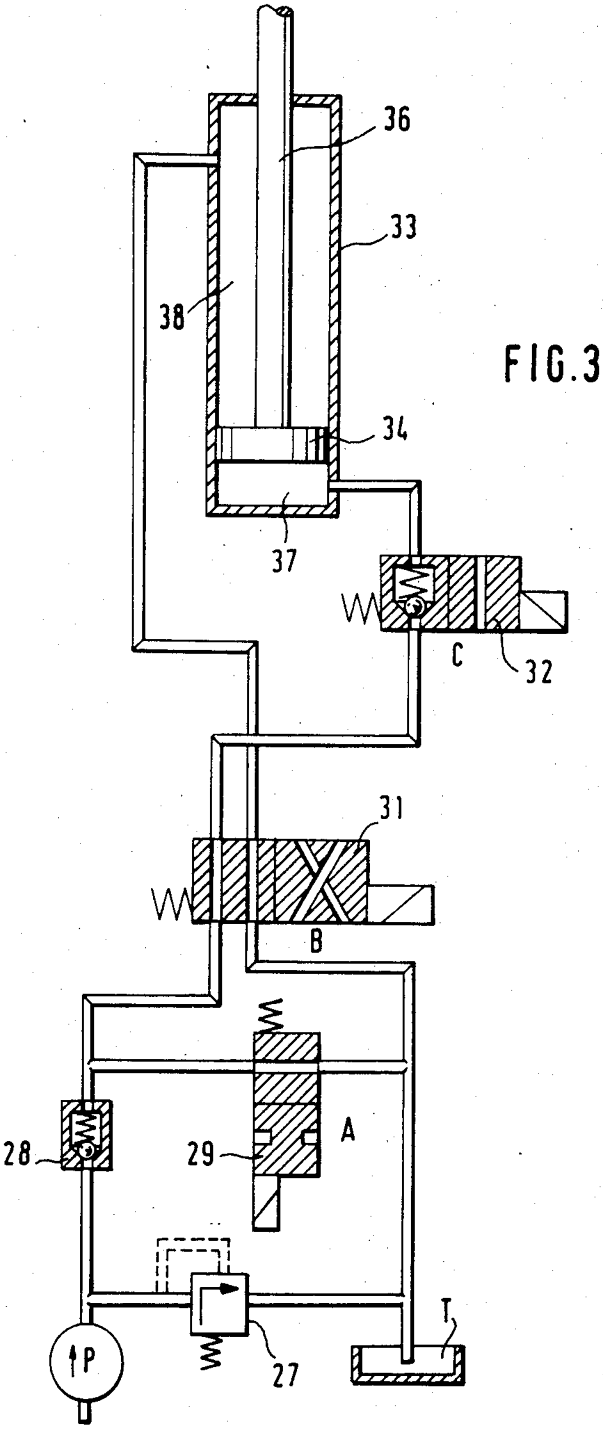
FIG. 3 is a pneumatic layout diagram for a case where the lifting jack according to FIG. 2 operates hydraulically.

In the example of embodiment, the lifting jack according to FIG. 2 has an electrohydraulic drive, the principle of which is shown in FIG. 3.

The motor device comprises an electric motor which drives a hydraulic pump and the electrical switching device switches valves disposed in the path between the hydraulic pump and one or other piston space of a hydraulic cylinder which is part of the lifting device.

The lift switch and the lower switch actuate idling of the electric motor. The switching device of each lifting jack has 'synchronism satisfied', a 'synchronous rhythm' and a 'synchronism stop circuit', and the synchronism stop circuit controls the operative elements of the motor devices.

According to FIG. 3, a pump P is driven by an electric motor, not shown. Symbolically provided as a tank is the tank T. From the pump to the tank runs a safety valve 27 which opens when the pressure is too high.

Provided above the pump and in the circuit is a non-return valve 28. As shown in FIG. 3, there then follow two further valves 29, 31 which determine the node of operation. The small box which is marked with a diagonal shows that they are driven by a relay, and the zig-zag line at the end of the valves 29, 31 (as also on the safety valve 27) shows that the return is effected by spring force. As indicated by the circuit in FIG. 3, a releaseable non-return valve 32 is also provided. It is not necessary literally to describe the exact location of the valves and the pattern of the circuit, since FIG. 3 clearly shows both to a man skilled in the art. Indicated at the top in FIG. 3 is a cylinder 33 in which a piston 34 is upwardly and downwardly movable, driving a piston rod 36. The piston rod 36 is pushed out when the space 37 is pressurised, which corresponds to lifting. The piston rod 36 is lowered when the space 38 is pressurised, which corresponds to lowering.

During lifting, the relay of the valve 29 latches, the valve moves upwardly and interrupts the communication condition which exists at rest. The valves 31, 32 remain in the position shown in the drawing. If lowering is intended, then the relays of valves 29, 31, 32 are latched and it is self-evident that the piston rod 36 and thus also the carriage 14 will be lowered.

Figure 4:
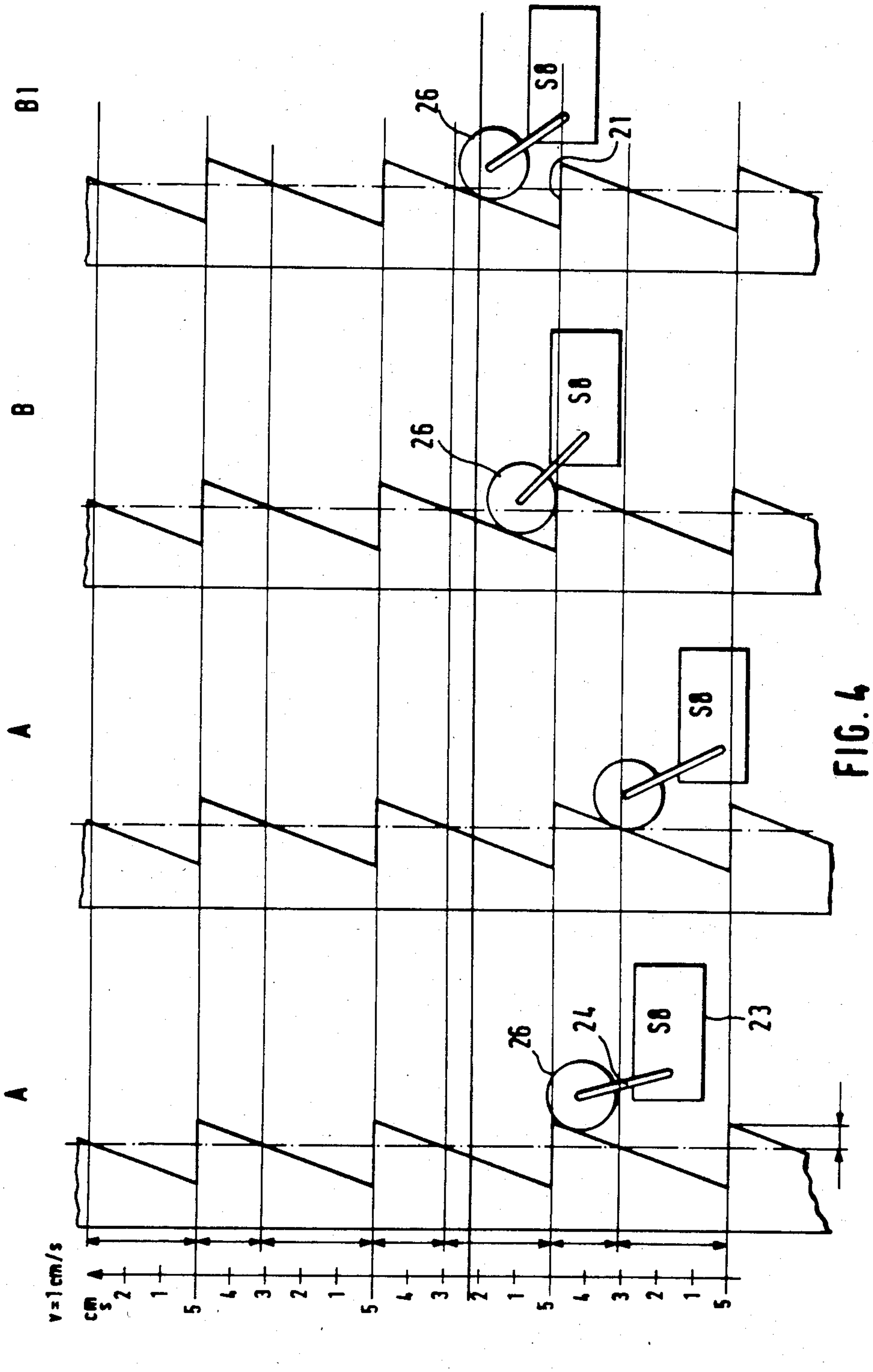
FIG. 4 is a diagram showing the switches according to FIG. 2 in different vertical positions for the instance according to FIG. 1, the pair C being omitted and showing also the switching paths, switching ranges and speed.

By reason of various circumstances, it may be that the lifting jacks shown in FIG. 1 move at different speeds. FIG. 4 shows this case for the lifting jacks shown in the drawing. Fastest was the subsidiary jack B1. Its roller 26 had dropped over the step 21 as shown in the moment for the roller 26 of the subsidiary jack B, and from this dropped position, the roller 26 of the subsidiary jack B1 had run on to the waiting line, although its switch S8 was at OFF, and in fact it runs for a second farther by reason of a time lag still to be discussed. The subsidiary jack B1 waits at the waiting line. Probably the next to reach the waiting line is subsidiary jack B, then the main jack A and finally the subsidiary jack A. When the subsidiary jack A has also arrived at the waiting line, then all the lifting jacks move on again jointly.

As shown with reference to FIG. 4, the periodic marking is of the length of the maximum admissible lift difference of the carriages.

This is the maximum distance that the system will allow between the leading jack and the most lagging jack. The length shown in FIG. 4 is 5 cm. The marking comprises projections which are rigidly connected to the column. The projections are emergency retainer projections. The projections are of saw-toothed shape. The saw-toothed shape has a falling flank extending at a right angle to the column and a flank which rises linearly therewith. Viewed in the upwards direction each marking unit has first an OFF zone and then an ON zone adjacent thereto. The OFF zone is substantially longer than the ON zone. The OFF zone is 3 cm long. The tracer comprises a switch housing on which there is articulated via a pivotable bracket a roller which scans the marking.

If the rollers 26 were not more spaced-apart than the time lag of one second, i.e. if the field had been closer together than shown in FIG. 4, then the subsidiary jack B1 would not have waited at the waiting line, but would have moved on, as is also the case with all the other jacks. Therefore, it only comes to a stop when one of the jacks is lagging behind by more than the time lag, which in the example of embodiment was chosen to be one second, and which may also be shorter.

It can also happen that the field below the waiting line in FIG. 4 is even less apart than the time lag, but that the time lag is exceeded with the next or next-but-one tooth. Then, again, the last lifting jack is awaited.

Since the selected speed is 1 cm/second, then the scale of speeds also corresponds to the scale of length.

Waiting only occurs within the repetition of a saw tooth. On the one hand, there is no need to ensure synchronism over more than one such repetition, because of course, within one repetition, there is always a wait until the last lifting jack has reached the waiting line. On the other hand, it would also be undesirable to induce synchronism beyond one repetition, because this would imply that the lifting tackles 17 were always running at the same height, quite regardless of the starting position. There are, however, cases in which the lifting tackles 17 of the different lifting jacks should indeed run equally, but not at the same height.

The circuit shown in FIG. 5 will now be explained. Here, too, not all the individual lines are mentioned. Reference is made expressly to the circuit. FIG. 5 shows firstly from the superscriptions the circuit which belongs to the main jack A, that which belongs to the subsidiary jack A, that which belongs to the subsidiary jack B and that which belongs to the subsidiary jack B1. It will be evident that the circuit is the same for all jacks, so that they can also be used individually, with no need to consider any special requirements concerning correlation. The current supply is taken in only on the main jack A, top left, and it is there that the switches S1 for joint lifting and the switches S2 for joint lowering are also provided. At the bottom, on the right, there are also in each dash-dotted box likewise switches S1 and S2. These run exactly the same as the switches S1 and S2 shown at the top left in FIG. 5. A transformer 39 transforms the mains voltage down from 380 V to 220 V. The switches S1 and S2 shown at the top, on the left, are applied to a common point 41. This is shown solid in FIG. 5 extending rightwardly as a conductor. When, for lifting purposes, the top left switch S1 is pressed, then all the other switches S1 of the individual lifting jacks close. Voltage is supplied to the line 12 and the electric motor (not shown) of the pump P runs. Also the line 7 receives voltage, because all the closers of the individual jacks which are disposed in it are closed. From the line 7, voltage passes through the line 42 to the line 8. At first, by reason of the openers being open, the line 6 remains dead. From point 43, voltage passes via the closers K2A and K3A to the relay K2A, synchronism satisified. This latches. With this, the K2A contacts shown over this relay move to the right. Before the left-hand closer opens, the right-hand opener has closed and thus the relay K2A latches at the common point 41. Above the relay K3A Synchronous Rhythm and the relay K4T Synchronism Stop there are two opener contacts K2A. With the attraction of the relay K2A, these also move to the right and close. With this, relay K4T Synchronism Stop also latches. This K4T relay has no time lag when attracted. According to the black box shown in the drawing, however, there is a time lag when it drops, and in fact this time lag is the one second already mentioned. Latching of K4T causes closure also of the opener contact K4T right of the relay K4T, and there, bottom left—viewed from the opener contact K4T—the switch S1 has of course already been closed, the voltage passes from the common point 41 to the consumer valve "lift". According to FIG. 3, this means that the valve 29 latches. The piston rod 36 thus runs upwardly. This means that the switch S8 closes. At this point, it should be pointed out that the S8 switches in FIG. 5 do not occupy the position shown in FIG. 4. Instead, they are all in the position OFF, since FIG. 5 represents the position of rest.

When in FIG. 5 the switch S8 closes, then the relay K3A Synchronous Rhythm also receives voltage from the common point 41, because of course the opener K2A upstream of it has closed. When the relay K3A latches, then all K3A contacts move into their other position, i.e. the K3A closers open and the K3A openers close. Normally, the broken line between two contacts means that these move in synchronism. All carriages 14 of the lifting jacks now move upwardly. When the line 8 is live, then the relay K7T Rhythm Monitoring 2 also latches, having a dropping time of 8 seconds. If this relay K7T is not drawn up at least every 8 seconds, then it opens its contacts not shown in FIG. 5 but which lie in the power supply. K7T—because it depends upon the voltage in the line 7—monitors whether one of the switches S8 is permanently closed for longer than 8 timed sequences. If this happens, the plant is shut down.

Relay K6T Rhythm Monitoring monitors the conjugate situation. It likewise has a dropping lag of 8 seconds and shuts down the power supply if any one of the switches S8 fails to close for 8 timed sequences. When the carriages 14 are synchronised, i.e. if all the switches S8 open within the delay of one second of the relay K4T, then all carriages 14 run without stopping again. The Synchronism Stop relay K4T does not of course have any opportunity of opening its opener K4T—which is of course closed.

It will be evident that by reason of the time lag of the relay K4T Synchronism Stop, at a position of the roller 26 such as is shown in FIG. 4 for the subsidiary jack B, this lifting jack is not shut down at once, but runs on for a second, which is equivalent to 1 cm, and then reaches a position as indicated in FIG. 4 for the roller 26 of the subsidiary jack B1.

As soon as a switch S8 opens, the associated Synchronous Rhythm relay K3A drops and the synchronism line 7 is closed again for the path which belongs to this jack, the synchronism monitoring loop is opened and therefore K4T is shut down. Let it now be assumed that the subsidiary jack B1 is lagging behind the main jack A, in fact by 1½ seconds. If the roller 26 of the main jack A has run over the flank 21, then the carriage 14 runs on for another second although its relay K3A has dropped, due to S8 opening, and therefore the line 7 and the line 42 are also dead.

In the case of the SynchronismStop relay K4T of the subsidiary jack B1, the time lag of one second starts to count half a second later than in the case of the main jack A, and the subsidiary jack B1 runs this half second longer than the main jack A. This means that it has caught it up and now all closer contacts in the line 7 are closed again, the point 43 is again live and a new working sequence can commence.

The situation is analogous during lowering.

What is vital is that a new timed sequence can only start again when the point 43 is live, and this requires all closers in the line 7 to be closed, which in turn requires all Synchronous Rhythm relays K3A to have dropped.

What is claimed is:

1. Apparatus for positively inducing synchronism in at least two movable lifting jacks, each lifting jack having an upwardly and downwardly movable carriage, a column, a lifting device extending along the column, a first control device to control the lifting device in a lift direction, a second control device to control the lifting device on a lower direction, and a motor device acting on the lifting device, at least one of the lifting jacks having a lift switch and a lower switch, comprising the improvement wherein:

a. each lifting device has an electrical switching device for operating the motor device,
b. a control line is looped serially through all of the lifting jacks and serially connects the electrical switching devices,
c. along each column there is an equally-spaced marking unit, the spacing corresponding to the maximum admissible lift difference between the lifting jacks,
d. each marking unit is rigidly connected along the length of each column,
e. each marking unit has an "ON" zone and an "OFF" zone,
f. rigidly fixed to each carriage is a tracer for scanning the marker units,
g. each tracer is in the electrical switching device, and inhibits the motor device when the tracer is in the "OFF" zone, until such time as the tracer of the carriage which is lagging most behind is also in the "OFF" zone,
h. after which the switching devices switch all motor devices on again,
i. the lift switch and the lower switch have a common point from which emerges a first rhythm monitoring line which is looped through all the lifting jacks and in which, at each lifting jack, there is in each case a closer contact which is closed when in the inoperative position,
j. from the rhythm monitoring line, a line leads to two serially disposed closer contacts which are connected to a delayless 'synchronism satisfied' relay,
k. the first of two closer contacts is operated by the 'synchronism satisfied relay',
l. connected to the common point is an opener contact which leads to a point between the two closer contacts, the opener contact also being operated by the 'synchronism satisfied' relay,
m. at the common point is disposed a serial connection of synchronism relays, the tracer switch and a parallel connection of two opener contacts, one of which is actuated by the 'synchronism' relays while the other is actuated by the 'synchronism satisfied' relay,
n. there is at the common point a serial connection of a time-delayed 'synchronism stop' relay and a parallel connection of two opener contacts, of which one is operated by the 'synchronism satisfied' relay and the other by a 'synchronism rhythm' relay, the 'synchronism stop' relay having a time lag which is substantially less than the time required to overrun one marking unit, and
o. there is at the common point a serial connection of and opener contact and a parallel connection of the first with the second control devices.

2. Apparatus according to claim 1, comprising the improvement wherein emerging from the rhythm monitoring line is a permanently closed relay, which has a substantially greater time lag than the 'synchronous stop' relay and the closer contacts of which lie in an energy supply line.

3. Apparatus according to claim 2, comprising the improvement wherein emerging from the common point is a second rhythm monitoring line which is likewise looped through all the lifting jacks and in which, at each lifting jack, there is an opener contact and which leads to a non closed relay which has a substantially greater time lag than the 'synchronous stop' relay and the closer contacts of which are likewise disposed in the energy supply line.

* * * * *